United States Patent
Grove-Nielsen

(10) Patent No.: US 9,421,742 B2
(45) Date of Patent: Aug. 23, 2016

(54) SANDWICH LAMINATE AND MANUFACTURING METHOD

(71) Applicant: Siemens Aktiengesellschaft, München (DE)

(72) Inventor: Erik Grove-Nielsen, Roslev (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 831 days.

(21) Appl. No.: 13/721,427

(22) Filed: Dec. 20, 2012

(65) Prior Publication Data

US 2013/0164133 A1    Jun. 27, 2013

(30) Foreign Application Priority Data

Dec. 22, 2011 (EP) .................................. 11195242

(51) Int. Cl.
*F03D 11/00* (2006.01)
*H05B 3/18* (2006.01)
*B32B 27/00* (2006.01)
*B32B 5/08* (2006.01)

(52) U.S. Cl.
CPC . *B32B 27/00* (2013.01); *B32B 5/08* (2013.01); *F03D 11/0025* (2013.01); *H05B 3/18* (2013.01)

(58) Field of Classification Search
CPC ..... F03D 11/0025; F03D 1/0675; H05B 3/18; B29C 65/3492; B32B 5/08
USPC ......... 416/95, 229 R, 230, 229 A; 156/273.9, 156/273.5, 275.5
See application file for complete search history.

(56) References Cited

U.S. PATENT DOCUMENTS

| | | | | | |
|---|---|---|---|---|---|
| 2,372,929 | A | * | 4/1945 | Blessing | B27D 1/04 156/273.9 |
| 7,473,385 | B2 | * | 1/2009 | Stiesdal | B29C 70/443 264/258 |
| 2009/0148300 | A1 | * | 6/2009 | Driver | B29C 65/3412 416/223 R |
| 2011/0180209 | A1 | * | 7/2011 | Grabau | B29C 33/16 156/285 |
| 2014/0030093 | A1 | * | 1/2014 | Dahl | F03D 1/0675 416/95 |

FOREIGN PATENT DOCUMENTS

| | | | | |
|---|---|---|---|---|
| CN | 101508190 A | 8/2009 | | |
| CN | 102001448 A | 4/2011 | | |
| DK | WO 2010018225 A2 | * 2/2010 | ............. | B29C 33/12 |
| EP | 2200396 A1 | 6/2010 | | |
| EP | 2289803 A2 | 3/2011 | | |
| SG | WO 2010025830 A2 | * 3/2010 | ............ | B29C 65/342 |
| WO | WO 2010133587 A1 | 11/2010 | | |

* cited by examiner

*Primary Examiner* — Ninh H Nguyen
*Assistant Examiner* — Jesse Prager

(57) ABSTRACT

A sandwich laminate for wind turbine blades includes a sandwich core material and an upper laminate part and a lower laminate part, wherein the upper laminate part and the lower laminate part have a thermoplastic matrix material and heating elements. The heating elements are electrically conductive fibers constituting electric circuits in the interior part of the thermoplastic matrix. Further, a wind turbine blade including such a sandwich laminate as well as a method of manufacturing such a sandwich laminate are provided.

12 Claims, 2 Drawing Sheets

SANDWICH LAMINATE AND MANUFACTURING METHOD

CROSS REFERENCE TO RELATED APPLICATIONS

This application claims priority of European Patent Application No. 11195242.0 EP filed Dec. 22, 2011. All of the applications are incorporated by reference herein in their entirety.

FIELD OF INVENTION

A sandwich laminate, in particular for wind turbine blades, comprises a sandwich core material and an upper laminate part and a lower laminate part, wherein the upper laminate part and the lower laminate part comprise a thermoplastic matrix material and heating elements. Further, a wind turbine blade with such a sandwich laminate and a method of manufacturing a sandwich laminate are provided. Furthermore, a finishing method and a de-icing method of a wind turbine blade are provided.

BACKGROUND OF INVENTION

Wind turbine blades for rotors of wind turbines have a length of about 40 meters or more, sometimes about 90 or 100 meters. The wind turbine blades need to be very stiff and, thus, usually constitute a shell structure comprising a metal or composite material. Such composite materials for wind turbine blades commonly consist of a plastic material that is reinforced with strong fibres such as glass fibres, carbon fibres or others. A growing number of such products are manufactured in a fibre reinforced thermoplastic material. For those products a mixed material of thermoplastic fibres and reinforcing fibres can be placed in a mould and melted by heating the mould. In the heated mould the thermoplastic matrix material melts and consolidates with the reinforcement fibres to form a strong composite material. For large structures with a high wall thickness or structures having an internal core structure, which itself is thermally insulating, it is however nearly impossible or at least time- and energy-consuming to heat up the material, especially the inner parts of the sandwich structure.

Therefore, thermoplastic materials are not common in products with higher wall thicknesses or having thermally insulating sandwich core materials such as balsa wood, honeycomb elements, PVC foam. Instead of the use of a thermoplastic material, a thermosetting polymer material such as polyester, vinyl ester or epoxy resin is commonly used in such composite materials (cf. WO 2010133587 A1).

Thermosetting composite materials have, however, several disadvantages such as high costs during the recycling of those materials or the accumulation of high amounts of waste if a recycling is not possible.

SUMMARY OF INVENTION

It is an object to provide an improved sandwich laminate for wind turbine blades, the wind turbine blades themselves and an improved process for manufacturing such a sandwich laminate. It is a further object to provide a reliable sandwich laminate in a cost sensitive way which is optionally easily recyclable. A further object is to provide a finishing method and a de-icing method of a wind turbine blade.

The objects are achieved by a sandwich laminate, a wind turbine blade, a method of manufacturing a sandwich laminate, a finishing method and a de-icing method according to the claims.

The sandwich laminate comprises a sandwich core material and an upper laminate part and a lower laminate part, wherein the upper laminate part and/or the lower laminate part comprise a thermoplastic matrix material and heating elements. The sandwich core material, having in particular the function of a support structure, may be either an interior core of a blade with an upper laminate part and a lower laminate part or a core layer of a sandwich laminate constituting the upper part blade shell or the lower part blade shell, for example of a wind turbine blade. If the length and the size of the blades increase to 40 or more meters, the blades are generally constituted of upper and lower part blade shells enclosing or embedding a cavity or space. For stability reasons, one or more webs, e.g. internal spacer or stabilizer elements, may be provided between the upper part blade shell and the lower part blade shell.

The heating elements of the sandwich laminate comprise electrically conductive fibres constituting electric circuits in the interior part of the thermoplastic matrix material. The electrically conductive fibres may be heated by an electric current flowing through the fibres. Thereby the heated electrically conductive fibres can be used for heating the thermoplastic matrix material, e.g. during the manufacturing process. Upon generating sufficient heat by the current to heat the electrically conductive fibres to a temperature higher than the melting point of the thermoplastic matrix material, it melts and consolidates with the electrically conductive fibres during the subsequent cooling process.

Electrically conductive fibres may be any fibre or wire or filament with a sufficient low resistance capable of heating the material surrounding the fibre by means of a current flowing through the electrically conductive fibres. The heating energy may be provided to the fibres either by galvanic contact leading a current through an electric circuit or by an inductive heating mechanism using an oscillating magnetic field to induce a current flowing in a ring structure constituted of the fibres. These two techniques and similar alternative techniques for heating the fibre structures can be used for heating the electrically conductive fibres.

The heating element is realized to heat the thermoplastic material surrounding the heating elements to thereby melt the thermoplastic material. For achieving a consolidation of the thermoplastic matrix material with the electrically conductive fibres, the heating elements are arranged for heating the thermoplastic matrix material bulk. Therefore, the heating elements can be arranged in one or more layers within the bulk matrix material so that the heating elements are suitable to provide enough heat to the thermoplastic matrix material. For increasing the surface of the heated regions in the thermoplastic matrix material, each of the heating elements can be arranged in a linear or curled or meander-like configuration within the thermoplastic matrix material layer.

The heating elements preferably provide a sufficient surface area to the thermoplastic material, for example by comprising a number of windings instead of a linear structure, to decrease the heating time or to melt a higher amount of surrounding thermoplastic matrix material during the same heating time.

If the electrically conductive fibres are small, the number of heating elements will be increased to an amount sufficient for heating the bulk of the thermoplastic matrix material in a reasonable time.

After the melting and cooling process, the obtained sandwich laminate comprises a sandwich core material and an upper and a lower laminate part produced from the consolidated composite material comprising the thermoplastic matrix material and the electrically conductive fibres as reinforcing elements. The electrically conductive fibres are, thus, heating elements during the manufacturing process and reinforcing elements in the final product because they provide a sufficient strength and stiffness to the thermoplastic material of the upper and lower laminate parts. Therefore, a reliable sandwich laminate can be produced in a cost-sensitive and effective manner.

Once the thermoplastic material is melted again, the sandwich laminate becomes easily recyclable. The conductive fibres or any additional heater, e.g. external heaters, may be used for melting the thermoplastic material and fractioning it into a separate fraction, while the core material and any other non-thermoplastic material remain in the other fraction. Hence, the sandwich laminate is easily producible, has a significant strength and stiffness, and can easily be recycled.

Another aspect is a wind turbine blade made of a sandwich laminate as described beforehand because of the improved characteristics such as the improved strength and stiffness of the sandwich laminate material and the improved recyclability.

Another aspect is an improved method of manufacturing such a sandwich laminate. The method comprises the following steps:
(a) providing a sandwich core material,
(b) arranging a mixture of a thermoplastic matrix material and a number of electrically conductive fibres as an upper laminate part and/or a lower laminate part on an upper and/or lower side of the sandwich core material, and
(c) supplying current to the number of conductive fibres for heating the conductive fibres to a temperature above the melting point of the thermoplastic matrix material.

If the blade is manufactured in a mould, a first mixture of thermoplastic matrix material and a number of electrically conductive fibres will be arranged, that means disposed or applied, as a lower laminate part in the mould, followed by a sandwich core material. Once the sandwich core material is provided, a second mixture of thermoplastic matrix material and a number of electrically conductive fibres will be arranged thereon as an upper laminate part of the core support structure. This can be done in consecutive steps or in one step on both sides of the sandwich core material, for example by winding the mixture of fibres around the sandwich core material. Similarly, the upper laminate part may be placed into the mould, followed by the sandwich core material and the lower laminate part.

The upper and lower laminate parts or layers comprising the mixture of a thermoplastic matrix material and the electrically conductive fibres may be prepared as a so called "kit", e.g. a woven or prepared mat, before being arranged in the mould or on the sandwich core material or may be placed fibre by fibre into the mould or onto the sandwich core material. If the matrix material comprises a granulated or powdered material or has a different form, e.g. is in the form of a web, the electrically conductive fibres may be arranged between the matrix material in a distinctive structure or configuration. The electrically conductive fibres are located substantially in the inner part of the thermoplastic matrix material so that they are fully covered with or encompassed by the thermoplastic material. In order to prevent short circuits, the electrically conductive materials are suitably spaced apart from each other and are fully surrounded by a non-conductive material such as the thermoplastic matrix material.

In the next step, current is supplied to the electrically conductive fibres constituting electric circuits in the interior part of the thermoplastic matrix material for heating it. The amount of current flowing through the electrically conductive fibres and the time of supplying the current depends on the thickness of the laminate layers to be melted and the melting point of the thermoplastic matrix material. In order to provide a sufficient strength to the sandwich laminate, the amount of heat produced by the internal heating elements, i.e. the electrically conductive fibres, must be sufficient to bond the thermoplastic matrix material to the surface of the sandwich core material.

In order to provide a suitable design of the sandwich laminate, e.g. in a blade design for a wind turbine, the heat-melting process may be supported by a pressing of the lower and upper laminate parts made of the thermoplastic matrix material and the electrically conductive fibres in a mould. This also allows for the formation of a specifically designed surface, e.g. a smooth surface. In addition, the mould may be heated in order to support the melting of the thermoplastic material, especially in the part of the outer surface of the sandwich laminate. As the thermoplastic matrix material is mainly heated internally, i.e. by means of the electrically conductive fibres, the melting process is improved over the commonly known processes using only an external heating by the mould. Especially, the process may reduce the melting time and/or the melting temperature because an overheating of parts of the laminate due to shielding effects of the sandwich core material or the thickness of the lower and upper laminate parts to be heated is not necessary. Advantageously, the internal heating elements are positioned in such manner that more heat is introduced at those locations where higher amounts of thermoplastic matrix material must be heated. For example, the heat can be directed to portions of a thermoplastic matrix material layer having a larger thickness than other portions or being shielded by insulating portions of the blade such as the core support structure. Therefore, an improved distribution of heat in the thermoplastic matrix material can be provided.

After the electrically conductive fibres have been used for heating the thermoplastic matrix material, e.g. during the manufacturing process, the current flow may be stopped and the thermoplastic matrix material is actively or passively (i.e. left to be) cooled down to a temperature below the melting point of the thermoplastic matrix material. In this step, the so-called cooling process, the thermoplastic matrix material consolidates with the electrically conductive fibres.

A further advantage of this process is that the electrically conductive fibres may be used as heating elements during a further process or finishing step in which the sandwich laminate structure is used. That means that the thermoplastic material may be melted again, for example to adjust the form of the blade or to apply a further layer, e.g. a cover layer or protective layer, onto the laminate.

In addition, the heating elements may also be used as heating elements in the final product, e.g. as de-icing means during the operation of a wind turbine blade. In this case, the temperature of the electrically conductive fibres is preferably adjusted below the melting point of the thermoplastic matrix material.

Particularly advantageous embodiments and features are provided by the dependent claims, as revealed in the following description. Further embodiments may be derived by combining the features of the various embodiments described in the following, and features of the various claim categories can be combined in any appropriate manner.

The sandwich laminate for wind turbine blades is preferably be made of a lightweight construction. In order to achieve this goal, the sandwich core material as a support structure preferably comprises a lightweight construction material such as a foamed polymer or a honeycomb or wood structure. Suitable examples of such materials may be PVC foam, cardboard, or balsa wood. They are preferably used in the sandwich laminate because of their low weights while simultaneously providing a high stiffness to the sandwich core material.

As those materials generally have thermally insulating properties, the usual manufacturing process, namely applying heat from the side of the mould only, makes those materials less preferred in the common technologies because of the shielding of the heat. However, in the sandwich laminate, internal heating elements are provided in the thermoplastic layers. Thus, the drawbacks are overcome and these materials are preferred due to their improved reinforcing and supporting properties due to a low weight.

The lightweight construction preferably comprises one or more laminate layers providing a sufficient strength to the core support structure. The laminate layers, i.e. the upper and lower laminate layers may comprise one or more layers, especially reinforced resin or plastic layers. The sandwich laminate preferably comprises at least one upper laminate part and at least one lower laminate part provided on the upper side and the lower side of the sandwich core material respectively. The upper and the lower laminate parts preferably comprise a thermoplastic matrix material. Exemplary thermoplastic matrix materials are polyvinylchloride (PVC), acrylonitrile-butadiene-styrene copolymers (ABS), polypropylene or polyethylene polymers or copolymers, HTPET (High Tenacity Polyethylene Terephthalate, also known as Thermoplastic Polyester), HTPP (High Tenacity Polypropylene Terephthalate), POM (Polyoxymethylene), PA6-Nylon or similar thermoplastic materials.

The electrically conductive fibres used in a preferred embodiment of the sandwich laminate may comprise carbon fibres or metal fibres, e.g. fine stainless steel fibres as used in some antistatic textiles or copper fibres. Those fibres are preferred because of their low electric resistance while providing a reinforcing effect to the thermoplastic material layer. Instead of carbon or metal fibres any electrically conductive fibres, such as yarns, filaments or wires, may be used in the sandwich laminate as long as heat can be generated by the fibres in response to a flow of current through the fibres or an external oscillating magnetic field inducing such a current flow.

Alternatively or in addition to the above electrically conductive fibres, fibres made of an electrically insulating material such as glass fibres or plastic fibres, e.g. fibres made of a thermoplastic material, can be used as such electrically conductive fibres if they have been made electrically conductive by covering them with or mixing therein a conductive material. Exemplary nonconductive fibre materials are, e.g., made of glass, basalt, aramid, flax, hemp or other natural fibre materials such as a high density polyethylene fibre commonly used in antistatic fabrics, e.g. PE-HD plastic from Premix named PRE-ELEC PE1299.

Conductive materials can be any common sizing agents and may comprise an electrically conductive powder and/or coating which can be used for generating a layer for a small heat generating current to flow on the fibre surface or make the whole fibre material conductive if mixed therein. Preferred coatings or powders comprise graphite or carbon black. As a preferred example, threads produced from thermoplastic compounds made conductive by the mixing in of the very common powder "carbon black" may be used as the electrically conductive fibres.

If the non-conductive fibre material has a good thermal conductivity, the electrically conductive material may be provided in the internal or core part of the fibre material. This would allow preventing short circuits while providing a good heating effect of the fibres to the thermoplastic matrix material.

Independent of the material of the electrically conductive fibres, they are adjusted to constitute electric circuits in the interior part of the thermoplastic matrix material for acting as heating elements. Electric circuits may be circuits running from a first end of the sandwich laminate to the opposite second end and back again. Both ends may be connected to a power supply for generating an electric current flow through the fibres, thus heating the fibres and the surrounding matrix material.

Alternatively, the electrically conductive fibres may constitute small electric circuits fully surrounded with the thermoplastic material. These small circuits can be heated up by an inductive coupling heating. This principle of inductive coupling heating is generally known to the skilled person, for example from cooking devices. According to this embodiment, one or more electric circuits comprising small circles, rings or other circle-like shapes made of the electrically conductive fibres or nano tubes, e.g. carbon nano tubes, can be used as the heating elements. The inductive heating is done by applying an oscillating magnetic field to the electric circuits. Thereby no direct line of connection is necessary, but the magnetic field can be applied also through a specific distance of about a few centimeters to some ten centimeters. The current will develop in the electric circuits, for example in the nano tubes, and will be converted into heat, which itself can melt the thermoplastic matrix material surrounding the heating elements.

The sandwich laminate preferably comprises a thermoplastic matrix material prepared by melting thermoplastic fibres or fabrics by means of the heating elements. As described above, the heating elements are placed between the thermoplastic fibres or fabrics during the manufacturing process and are designed such that they generate heat to the surrounding thermoplastic matrix material. For example, a mixture of thermoplastic fibres and electrically conductive fibres can be prepared beforehand and placed into the mould by an automated or manual manufacturing process of a sandwich laminate. Thereby the mixed fibre material can be arranged in a specific pattern so that an improved heating pattern is provided by the heating elements during the manufacturing process. Due to the quick heating of the thermoplastic matrix material, even in a thick laminate or if a thermally insulating core material is comprised in the sandwich laminate, an improved heat distribution within the laminate layers can be provided. Hence, the final laminate has an improved characteristic due to the variety of materials that can be used as the core material and the improved bonding properties of the thermoplastic laminate layer to the core support structure.

The sandwich laminate may have a thermoplastic matrix material additionally comprising a reinforcing material such as reinforcing glass, plastic or carbon fibres, carbon nano tubes, or natural fibres. Any reinforcing material usually used in common composite materials can be used for enhancing the strength and stiffness of the sandwich laminate. The amount depends on the required properties and can be lower than usually used because the electrically conductive fibres used as heating elements have not only a heating property but a reinforcing effect, too. If carbon fibres or carbon nano tubes are used, they are preferably placed in parts of the laminate not in contact with the electrically conductive fibres to prevent short circuits with them.

In another preferred embodiment of the sandwich laminate, the core support structure comprises a number of electrically conductive passages such as threads and/or yarns protruding in the upper and the lower laminate parts, especially for electrically connecting the upper and the lower laminate parts with each other. For example, if one of the upper or lower laminate parts is an interior laminate layer, that means is located at the inner side of the upper or lower blade shells in the final wind turbine blade, the passages can be used as electrical connection from the outer laminate parts to the inner laminate parts. The passages may be prepared by sewing threads, e.g. made of copper or other conductive materials, or by providing bolts between the upper and lower laminate parts. If one or more of such passages are provided in the upper blade shell, for example, the electrically conductive fibres can run from the root of the laminate part to the tip of the blade in a meander like manner across the core support structure so that parts of the upper laminate part and parts of the lower laminate part which are next to the core support structure can be heated. Thereby, the heat can be provided in the inner part of the laminate layers. Hence, the bonding strength between the core support structure and the laminate layers made of a thermoplastic matrix material can be improved. Those conductive structures can be used in addition to the electrically conductive wires or instead of them depending on the laminate thickness.

Alternatively, the electrically conductive passages can be formed by means of a web or wires placed on the web of a wind turbine blade provided between the upper and the lower blade shells. Those webs or wires, e.g. lightning devices, can be used to electrically connect the upper and the lower shells of the blade.

The sandwich laminate can suitably be used in a wind turbine blade. More particularly, it provides the wind turbine blade with an improved stiffness and strength because thicker laminates can be prepared and a high variety of sandwich core materials as support structures can be used for the above explained reasons. In addition, such a wind turbine blade can be recycled by heating the blade either by means of the internal heating means or by external heaters, thereby melting the thermoplastic material and separating the thermoplastic fraction from any other components.

For a wind turbine blade, the electric current can be lead from the root area to the tip area and back to the root area again by respectively placing the electric conductive fibres into the mould. Thus, the wind turbine blades can easily be prepared in a cost sensitive manner.

Preferably, the wind turbine blade comprises an upper part blade shell and a lower part blade shell. The upper part blade shell or the lower part blade shell or both shells are comprised of the sandwich laminate. The lower part blade shell and/or the upper part blade shell may optionally be connected by a web, which is a stabilizer portion or spacer, for enhancing the stability of the wind turbine blade structure. The web may be provided with a lightning conductor element avoiding risky damages due to a lightning stroke. The lightning conductors can at the same time function as conductive wires to lead current to the electrically conductive fibres at the tip of the blade. In another alternative way, the lightning conductor may be used for receiving current at the tip from electrically conductive fibres running in the laminate layer to the tip of the blade and being connected to the lightning conductors.

In an alternative embodiment, especially for smaller blades, the whole blade constitutes the sandwich laminate. That means the upper part blade shell comprises the upper laminate part and the lower part blade shell comprises the lower laminate part. Between both laminate parts, the core support structure is provided. Such structures can be advantageous if the blade length is not more than about 20 meters, preferably not more than 10 meters due to stability reasons.

Preferably, the electrically conductive fibres are arranged in the thermoplastic matrix material of the sandwich laminate constituting the upper and the lower part blade shells in a substantially longitudinal direction from a blade root to a tip of the blade in a substantially linear direction. In this case, the electrically conductive wires can be placed in the laminate layers in an effective manner to introduce the heat into the most wanted places. Thereby an appropriate distribution of the heat from the root area to the tip area of the blade can be provided. As the length of the blades can be more than 30 meters, the electrically conductive fibres shall have substantially at least the same length as the blades in one direction from the root to the tip and the same length in the direction back to the root. Thus, if the fibres are placed in a nearly linear direction, the time for heating the thermoplastic matrix material in any area of the blade can be improved by minimizing the length of the electrically conductive fibres.

In a preferred constitution of the wind turbine blade, a number of the electric circuits are constituted by electrically conductive fibres running from the blade root to the tip of the blade in the upper part blade shell and backwards from the tip to the root in the lower part blade shell. Thereby both blade shells, the lower part blade shell and the upper part blade shell, can be heated by using the same electric circuits in both blade shells. In case of a sandwich laminate structure of the upper and the lower part blade shells, the electrically conductive fibres can either be placed in any of the lower laminate parts or upper laminate parts of each shell or can be connected via electric connection passages as described above. In any case, any laminate layer, i.e. thermoplastic matrix material layer, can be heated in an appropriate manner at the same time.

Alternatively, a number of electric circuits can be constituted by electrically conductive fibres running from the blade root to the tip of the blade in the upper portion or lower portion of an upper or lower part blade shell and backwards from the tip to the root in a space between the upper and the lower part blade shells. For example, a web or a lightning conductor placed in this space can be used as the conductive wire for receiving the current at the tip of the blade and transporting it to the root of the blade.

The sandwich laminate for the use in a wind turbine blade can be prepared by a method using an internal heating of the heating elements constituted of the electrically conductive fibres to melt the thermoplastic matrix material. Preferably, a number of thermoplastic fibres and/or thermoplastic fabrics are arranged together with the number of electrically conductive fibres and optionally other reinforcing fibres. Thereby, an appropriate distribution of the heating elements and of the heat to be generated can be provided in the thermoplastic matrix material layer.

Optionally, a number of inductive heating elements, e.g. carbon nano tubes, etc., can be mixed into the mixture of the thermoplastic matrix material and the number of electrically conductive fibres. Due to the additional heating effect by using an additional inductive heating process, e.g. by applying an external oscillating magnetic field, the time for melting the thermoplastic matrix material can be reduced compared to the sole heating by means of the electrically conductive fibres.

Due to the internal heating elements provided in the upper and/or lower laminate parts, no external heating system from outside the sandwich laminate, e.g. a heated mould, hot oil or air or water-based heating systems etc., is necessary. In addition, the method is safer than the common methods in which a mould is heated, because the workers are not exposed to hot surfaces of an external heating system.

Other objects and features of the present invention will become apparent from the following detailed description considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like reference numbers refer to like objects throughout. Objects in the diagrams are not necessarily drawn to scale.

DETAILED DESCRIPTION OF INVENTION

Figure 1:
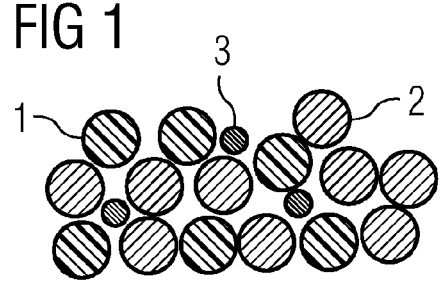
FIG. 1 shows a schematic view of a laminate part of an embodiment of the sandwich laminate before heating.

FIG. 1 shows a schematic view of a laminate part of an embodiment of the sandwich laminate before heating. A mixture of thermoplastic fibres 1, reinforcing fibres 2, and electrically conductive fibres 3 are shown in its cross section. The electrically conductive fibres are appropriately placed so that they are sufficiently surrounded by the thermoplastic fibres 1 and reinforcing fibres 2 to avoid any short circuits between conductive fibres 3.

Figure 2:
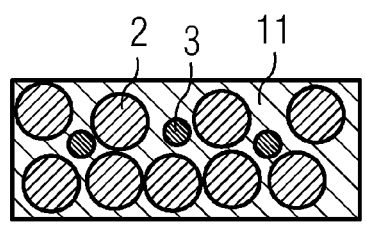
FIG. 2 shows a schematic view of the laminate part of FIG. 1 after heating.

FIG. 2 shows the same laminate part of FIG. 1 after heating, i.e. after current was led through the electrically conductive fibres 3 and thereby heated them to a temperature higher than the melting point of the thermoplastic fibre material 1. After the thermoplastic fibres 1 have been melted and consolidated by cooling, the electrically conductive fibres 3 and the reinforcing fibres 2 are appropriately distributed in a rigid thermoplastic matrix material 11. Due to the accurate placement of the electrically conductive fibres 3 in the mixture and, optionally, due to the admixture of non-conductive reinforcing fibres 2, the electrically conductive fibres 3 are spaced apart from each other to prevent short circuits between two or more of the electrically conductive fibres 3.

Figure 3:
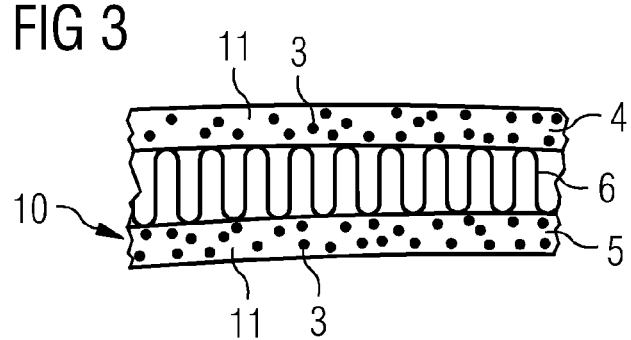
FIG. 3 shows a cross section of a sandwich laminate of an embodiment.

FIG. 3 shows a cross section of a sandwich laminate 10 according to an embodiment comprising an upper laminate part 4, a lower laminate part 5, and a sandwich core material 6. The sandwich core material 6 is sandwiched between the upper and the lower laminate parts 4, 5 to provide an appropriate support for the thermoplastic matrix material layers. The sandwich core material 6 is made of a light weight material, e.g. balsa wood as shown in this drawing, and provides an appropriate stiffness to the sandwich laminate 10 as a suitable composite material for, e.g. wind turbine blades.

Two laminate layers 4, 5 made of a thermoplastic matrix material 11, in the drawing an ABS polymer, are supported by the sandwich core material 6 on the upper surface and the lower surface of the core. The thermoplastic matrix comprises electrically conductive fibres 3, here carbon fibres, as internal heating elements. Additionally, reinforcing fibres (not shown) may be present in the matrix to further improve the stiffness and strength of the thermoplastic matrix material and, thus, of the sandwich laminate 10. The electrically conductive fibres 3 are directed in longitudinal direction, i.e. they extend perpendicular to the plane of the sheet in FIG. 3.

If the sandwich laminate 10 shown in FIG. 3 is a part of a wind turbine blade, the view as shown here will be from the root area into the tip area. Then the electrically conductive fibres run from the root area in a linear direction to the tip area of the blade and in the same manner back again. In FIG. 3 the electrically conductive fibres 3 in the upper laminate part 4 are adjusted such that the current flow therein goes from the root area to the tip area (i.e. into the sheet). At the same time, the electrically conductive fibres 3 in the lower laminate part 5 receive the current at the tip area and transport it back to the root area (current flows out of the sheet). Thereby an electric circuit may be closed at a power supply (not shown) connected to the electrically conductive fibres 3 at the root area.

Of course, alternative current flows can be provided as has been described in the above description of the preferred embodiments. For example, the current can flow in the other direction or can be collected at the tip in a collecting electrode, e.g. a lightning conductor, provided in the space between the upper blade shell and the lower blade shell.

Figure 4:
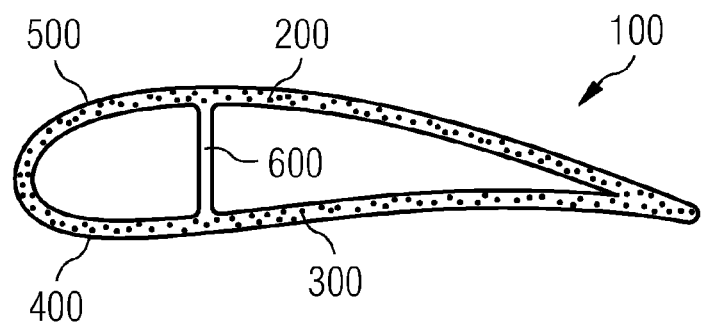
FIG. 4 shows a cross section of a wind turbine blade of an embodiment.

FIG. 4 shows a cross section of a wind turbine blade 100 according an embodiment. The wind turbine blade 100 comprises a lower part blade shell 400 with electrically conductive fibres 300 and an upper part blade shell 500 with electrically conductive fibres 200. The same materials as in the sandwich laminates of FIG. 3 are used in this blade for the lower and upper part blade shells made both of a sandwich laminate 10 as shown in FIG. 3.

For stability reasons, the blade 100 comprises a web 600 connecting the lower and the upper part blade shells as additional reinforcing members. The part which is preferably to be stabilized is the part where the blade has its thickest portions, that means the part of the blade where the lower and the upper part blade shells have the biggest distance from each other (as shown in FIG. 4). Of course, two, three or more webs (600) may be provided within the space inside the blade 100. The space may be a hollow space or may be partly or totally filled with a honeycomb structure or any other lightweight material.

Figure 5:
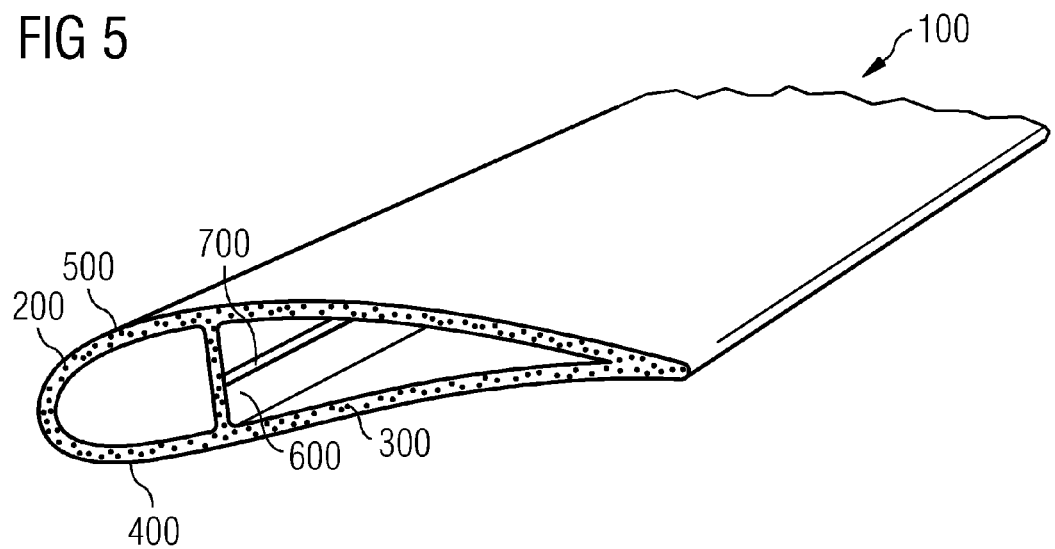
FIG. 5 shows a perspective view of the wind turbine blade cross section of FIG. 4.

FIG. 5 shows a perspective view of the wind turbine blade cross section of FIG. 4, wherein a metal lightning conductor 700 is provided along the web 600 from the root area to the tip area of the blade 100. In FIG. 5, the blade is cut shortly behind the root area (not shown) and the section in direction to the tip (not shown) is shown in the drawing.

Figure 6:
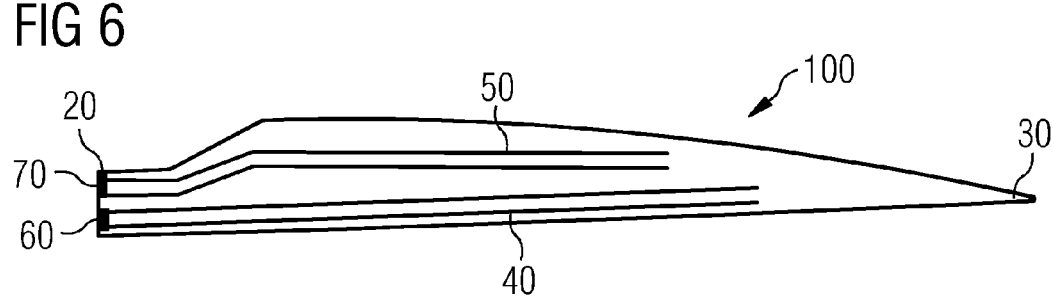
FIG. 6 shows another cross section, namely in the longitudinal direction of the blade, of the wind turbine blade of FIG. 5.

FIG. 6 shows a cross-sectional plan view of the wind turbine blade of FIG. 5. The cut is made from the blade root 20 to the tip 30 within the upper laminate part of the sandwich laminate of the upper part blade shell 20. The electrically conductive fibres 40 are directed from the root 20 to the tip 30 and lead electric current from a power supply (not shown) provided at the electric current input 60 towards the tip 30 of the blade 100. The electrically conductive fibres 50 receive the electric current from the tip end 30 (connection to the electrically conductive fibres 40 is not shown) and lead it to the electric current output 70 at the root 30 of the blade to close the electric circuit with the power supply (not shown). The electrically conductive fibres 40, 50 are arranged in a substantially linear manner from the root area 20 to the tip area 30 of the blade 100. They are spaced from each other to avoid short circuits.

Figure 7:
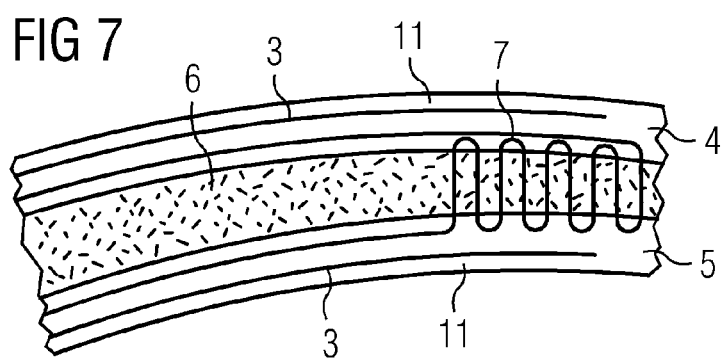
FIG. 7 shows a cross section of a sandwich laminate of another embodiment.

FIG. 7 shows a cross section of a sandwich laminate according to another embodiment. The sandwich laminate comprises an upper laminate part 4, a lower laminate part 5, and a sandwich core material 6. Supported by the sandwich core material 6 on the upper surface and the lower surface of the core are two laminate layers 4, 5 made of a thermoplastic matrix material 11, e.g. an ABS polymer as shown in FIG. 7. The thermoplastic matrix material comprises electrically conductive fibres 3, here carbon fibres, as internal heating elements. In this drawing they are directed within the plane of the sheet in a substantially longitudinal direction, that means from the root area (at the left side) to the tip area (at the right side).

Conductive threads 7 are provided in selected areas of the sandwich core material 6. They form connections from the upper laminate part 5 to the lower laminate part 4 across the sandwich core material 6. In the drawing the conductive threads are prepared by sewing threads of copper through the insulating sandwich core material. Alternatively, previously prepared passages with conductive elements or conductive bolts could be used instead of the copper threads to form electrically connective passages between the lower and upper laminate parts. The conductive element must have low electric resistance in order to avoid heating of the sandwich core material.

The additional conductive threads can be provided throughout the whole surface of the sandwich core material in specific patterns or only in selected areas thereof. The conductive threads help to quickly heat the surface area of the thermally insulating sandwich core material and, thus, improving the bonding of the thermoplastic laminate parts to the sandwich core material. This can improve the reliability of the wind turbine blades.

Figure 8:
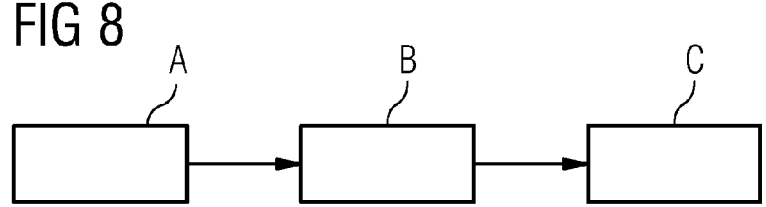
FIG. 8 shows a flow chart of a method.

FIG. 8 shows a flow chart of a method comprising the following steps for providing a sandwich laminate as shown in FIG. 3:

A) providing a sandwich core material 6,

B) arranging a mixture of a thermoplastic matrix material 1 and a number of electrically conductive fibres 3 as an upper laminate part 4 and/or a lower laminate part 5 for an upper side or lower side of the sandwich core material 6, and C) supplying current to the number of electrically conductive fibres 3 for heating the electrically conductive fibres to a temperature above the melting point of the thermoplastic matrix material 1, 11.

Optionally a cooling step may follow wherein the obtained sandwich laminate structure 10 is actively or passively cooled down to a temperature lower than the melting point of the thermoplastic matrix material 1, 11.

Although the present invention has been disclosed in the form of preferred embodiments and variations thereon, it will be understood that numerous additional modifications and variations could be made thereto without departing from the scope of the invention. While the invention has been described with reference to wind turbine blades, other blades, wings or rotors for airplanes, helicopters, coolers, or car parts as well as parts in the automotive industry or similar devices may also be prepared with the method of the invention. The internal heated thermoplastic laminate layers in composite materials can be widely used in similar technical fields. For the sake of clarity, it is to be understood that the use of "a" or "an" throughout this application does not exclude a plurality, and "comprising" does not exclude other steps or elements. A "means", "device" or "element" can comprise a number of separate means, devices or elements, unless otherwise stated.

The invention claimed is:

1. A sandwich laminate, comprising:
   a sandwich core material,
   an upper laminate part and a lower laminate part,
   wherein the upper laminate part and the lower laminate part comprise a thermoplastic matrix material and heating elements,
   wherein the heating elements are electrically conductive fibres constituting electric circuits in an interior part of the thermoplastic matrix material,
   wherein the sandwich core material comprises a plurality of electrically conductive passages protruding into the upper and the lower laminate parts.

2. The sandwich laminate according to claim 1, wherein the sandwich core material comprises a foamed polymer and/or a honeycomb structure and/or a wood structure.

3. The sandwich laminate according to claim 1, wherein the electrically conductive fibres comprise carbon fibres and/or metal fibres and/or glass or plastic fibres covered with an electrically conductive layer.

4. The sandwich laminate according to claim 1, wherein the thermoplastic matrix material comprises a reinforcing material.

5. A wind turbine blade, comprising:
   a sandwich laminate according to claim 1.

6. The wind turbine blade according to claim 5, further comprising:
   an upper part blade shell and a lower part blade shell, connected by a web, wherein the upper part blade shell and/or the lower part blade shell are part of the sandwich laminate.

7. The wind turbine blade according to claim 5, wherein the electrically conductive fibres are arranged in the thermoplastic matrix material of the sandwich laminate in a substantially longitudinal direction from a blade root to a tip of the blade in a substantially linear direction.

8. The wind turbine blade according to claim 5, wherein a number of the electric circuits are constituted by the electrically conductive fibres running from the blade root to the tip of the blade in the upper part blade shell and backwards from the tip to the root in the lower part blade shell.

9. The wind turbine blade according to claim 5, wherein a number of the electric circuits are constituted by the electrically conductive fibres running from the blade root to the tip of the blade in the upper portion or lower portion of an upper or lower part blade shell, respectively, and back from the tip to the root in a space between the upper and the lower part blade shells.

10. A method of manufacturing a sandwich laminate, comprising:
    providing a sandwich core material,
    arranging a mixture of a thermoplastic matrix material and a number of electrically conductive fibres as an upper laminate part and/or a lower laminate part for an upper side or lower side of the sandwich core material, and
    supplying current to the number of electrically conductive fibres for heating the electrically conductive fibres to a temperature above the melting point of the thermoplastic matrix material,
    wherein the sandwich core material comprises a plurality of electrically conductive passages protruding into the upper and the lower laminate parts.

11. The method according to claim 10, wherein the mixture comprises a number of thermoplastic fibres and/or thermoplastic fabrics for arranging together with the number of electrically conductive fibres.

12. The method according claim 10, further comprising:
    arranging theta mixture of the thermoplastic matrix material and the number of electrically conductive fibres together with a number of inductive heating elements.

* * * * *